United States Patent
Yi (10) Patent No.: US 11,687,966 B2
(45) Date of Patent: Jun. 27, 2023

(54) DWELL TIME BASED ADVERTISING

(71) Applicant: Oath Inc., New York, NY (US)

(72) Inventor: Xing Yi, Milpitas, CA (US)

(73) Assignee: Yahoo Ad Tech LLC, New York, NY (US)

( * ) Notice: Subject to any disclaimer, the term of this patent is extended or adjusted under 35 U.S.C. 154(b) by 0 days.

(21) Appl. No.: 16/558,551

(22) Filed: Sep. 3, 2019

(65) Prior Publication Data
US 2019/0392477 A1   Dec. 26, 2019

Related U.S. Application Data

(63) Continuation of application No. 13/975,151, filed on Aug. 23, 2013, now abandoned.

(51) Int. Cl.
   *G06Q 30/0242*   (2023.01)
(52) U.S. Cl.
   CPC ................. *G06Q 30/0242* (2013.01)
(58) Field of Classification Search
   CPC .................................. G06Q 30/0242
   See application file for complete search history.

(56) References Cited

U.S. PATENT DOCUMENTS

| | | | | |
|---|---|---|---|---|
| 2010/0114668 A1* | 5/2010 | Klein | ................. | G06Q 30/0243 705/14.42 |
| 2013/0018632 A1* | 1/2013 | Field | ................. | G06Q 30/0242 702/183 |
| 2013/0191226 A1* | 7/2013 | Smallwood | ............ | G06Q 10/00 705/14.68 |

* cited by examiner

*Primary Examiner* — Alexandru Cirnu
(74) *Attorney, Agent, or Firm* — Cooper Legal Group LLC (57) ABSTRACT

A method for online advertising, is provided, including: receiving a request for a web page from a client device; in response to the request, selecting an advertisement for presentation on the web page, and transmitting the web page to the client device; determining a duration of exposure of the advertisement when the web page is presented on the client device; determining a level of performance of a guaranteed presentation amount associated with the advertisement, the level of performance based on the duration of exposure of the advertisement. In another embodiment, a plurality of candidate advertisements are identified for presentation on a requested web page; for each candidate, an expected cost per time unit (eCPTU) of exposure is determined; one candidate advertisement is selected for presentation on the web page based on the eCPTU's; the web page is transmitted to a client device.

20 Claims, 7 Drawing Sheets

DWELL TIME BASED ADVERTISING

RELATED APPLICATIONS

The present disclosure claims priority to and is a continuation of U.S. application Ser. No. 13/975,151, filed on Aug. 23, 2013, entitled "DWELL TIME BASED ADVERTISING", which is related to U.S. application Ser. No. 13/843,433, filed on Mar. 15, 2013, entitled "Display Time of a Web Page," and to U.S. application Ser. No. 13/843,504, filed on Mar. 15, 2013, entitled "Page Personalization Based on Article Display Time," and to U.S. application Ser. No. 13/975,157, filed on Aug. 23, 2013, entitled "Dwell Time Based Advertising in a Scrollable Content Stream." The disclosures of U.S. application Ser. No. 13/975,151, U.S. application Ser. No. 13/843,433, U.S. application Ser. No. 13/843,504 and U.S. application Ser. No. 13/975,157 are herein incorporated by reference in their entirety for all purposes.

BACKGROUND

1. Field

The present disclosure relates to methods and systems for dwell time based advertising.

2. Description of the Related Art

At present, Internet users enjoy access to vast quantities of information available through websites and their associated webpages. To provide an even better experience for users, website owners seek to customize the content of the webpages presented to users based on knowledge of the user's preferences, browsing history, and other information specific to each user. Advertisers seeking to promote their products, services, message, etc. seek to target their advertising for certain purposes. By acquiring a better understanding of a given user, both website owners and advertisers can benefit by being able to provide relevant content and advertising to the user, and the user also benefits by receiving content and advertising that he or she is more likely to find engaging.

It is in this context that embodiments of the present disclosure arise.

SUMMARY

Broadly speaking, embodiments of the present disclosure provide methods and systems for dwell time based advertising. Several embodiments of the present disclosure are described below.

In one embodiment, a method for online advertising, is provided, including the following method operations: receiving a request for a web page from a client device; in response to the request, selecting an advertisement for presentation on the web page, and transmitting the web page to the client device; determining a duration of exposure of the advertisement when the web page is presented on the client device; determining a level of performance of a guaranteed presentation amount associated with the advertisement, the level of performance based on the duration of exposure of the advertisement; wherein the method is executed by at least one processor.

In one embodiment, determining the duration of exposure of the advertisement on the requested web page includes processing event data indicative of user interaction with the requested web page.

In one embodiment, presentation of the advertisement on the requested web page is defined by transmission of data defining the requested web page configured to include the advertisement.

In one embodiment, the guaranteed presentation amount defines a number of impressions for the advertisement.

In one embodiment, determining the level of performance includes assigning a weight to the presentation of the advertisement based on the duration of exposure, and aggregating the weighted presentation of the advertisement with prior weighted presentations of the advertisement, each prior weighted presentation being defined by a prior presentation of the advertisement weighted by a prior duration of exposure.

In one embodiment, the guaranteed presentation amount defines a total duration of exposure for the advertisement.

In one embodiment, determining the level of performance includes aggregating the duration of exposure for the presentation on the client device with prior durations of exposure of the advertisement.

In one embodiment, selecting the advertisement includes determining a match between a target profile associated with the advertisement and an opportunity profile associated with the web page, the opportunity profile being based on one or more of characteristics of content to be presented on the web page or characteristics of a user of the client device.

In another embodiment, a method for online advertising is provided, including the following method operations: receiving a request for a web page from a client device; identifying a plurality of advertisements as candidates for presentation on the web page; for each of the plurality of advertisements, determining an expected cost per time unit (eCPTU) of exposure; selecting one of the plurality of advertisements for presentation on the web page based on the eCPTU's of the plurality of advertisements; transmitting the web page to the client device; wherein the method is executed by at least one processor.

In one embodiment, selecting one of the plurality of advertisements includes performing an auction for an advertising opportunity defined by the web page based on the eCPTU's of the plurality of advertisements.

In one embodiment, identifying the plurality of advertisements includes determining a match between a target profile associated with each of the plurality of advertisements and an opportunity profile associated with the web page, the opportunity profile being based on one or more of characteristics of content to be presented on the web page or characteristics of a user of the client device.

In one embodiment, determining the eCPTU for each of the plurality of advertisements includes converting one or more of a cost per impression (CPM) bid, a cost per click (CPC) bid, or a cost per conversion (CPA) bid to the eCPTU.

In one embodiment, converting the CPM bid to the eCPTU includes dividing the CPM bid by an average exposure duration per impression for the advertisement.

In one embodiment, converting the CPC bid includes multiplying the CPC bid by a probability that presentation of the advertisement will result in a click activity.

In one embodiment, converting the CPA bid includes multiplying the CPA bid by a probability that presentation of the advertisement will result in a conversion activity.

In one embodiment, the method further includes determining a duration of exposure of the selected advertisement when the web page is presented on the client device.

In one embodiment, determining the duration of exposure of the selected advertisement on the requested web page includes processing event data indicative of user interaction with the requested web page.

In one embodiment, presentation of the selected advertisement on the requested web page is defined by transmission of data defining the requested web page configured to include the selected advertisement.

In another embodiment, a method for online advertising, is provided, including the following method operations: receiving a request for a web page from a client device; in response to the request, selecting a first advertisement and a second advertisement for presentation at a same location on the web page, and transmitting the web page to the client device; determining a duration of exposure of each of the first advertisement and the second advertisement when the web page is presented on the client device; determining a level of performance of a guaranteed presentation amount associated with the first advertisement and a guaranteed presentation amount associated with the second advertisement, the level of performance of each of the first and second advertisements being based on the duration of exposure of each of the first advertisement and the second advertisement, respectively; wherein the method is executed by at least one processor.

In one embodiment, the presentation of the web page on the client device defines a single impression during which each of the first advertisement and the second advertisement are presented at the same location on the web page.

Other aspects of the present disclosure will become apparent from the following detailed description, taken in conjunction with the accompanying drawings, illustrating by way of example the principles of the present disclosure.

BRIEF DESCRIPTION OF THE DRAWINGS

The present disclosure may best be understood by reference to the following description taken in conjunction with the accompanying drawings in which.

DETAILED DESCRIPTION

The following embodiments describe systems and methods for dwell time based advertising. It will be obvious, however, to one skilled in the art, that the present disclosure may be practiced without some or all of these specific details. In other instances, well known process operations have not been described in detail in order not to unnecessarily obscure the present disclosure.

In the present disclosure, methods and systems are described for using article-level (or page-level) dwell time, or user time spent, for pricing both guaranteed delivery (GD) display ads contracts and non-guaranteed delivery (NGD) display ads contracts in online display advertising. Methods and systems for determining dwell time are provided with reference to U.S. application Ser. No. 13/843,433, filed Mar. 15, 2013, entitled "Display Time of a Web Page," and U.S. application Ser. No. 13/843,504, filed Mar. 15, 2013, entitled "Page Personalization Based on Article Display Time," the disclosures of which are incorporated by reference.

Broadly speaking, systems and methods in accordance with the present disclosure leverage article-level dwell time information for various aspects of display advertising. Dwell time information provides a more accurate and fine-grained understanding of user engagement than conventional click or action-based measures of user engagement. Therefore, its application to various advertising models as discussed in further detail below serves to improve efficiencies of the display advertising process. Compared with conventional methods and systems for display advertising, methods and systems in accordance with the present disclosure can provide improved fairness to both publishers and advertisers.

Figure 1:
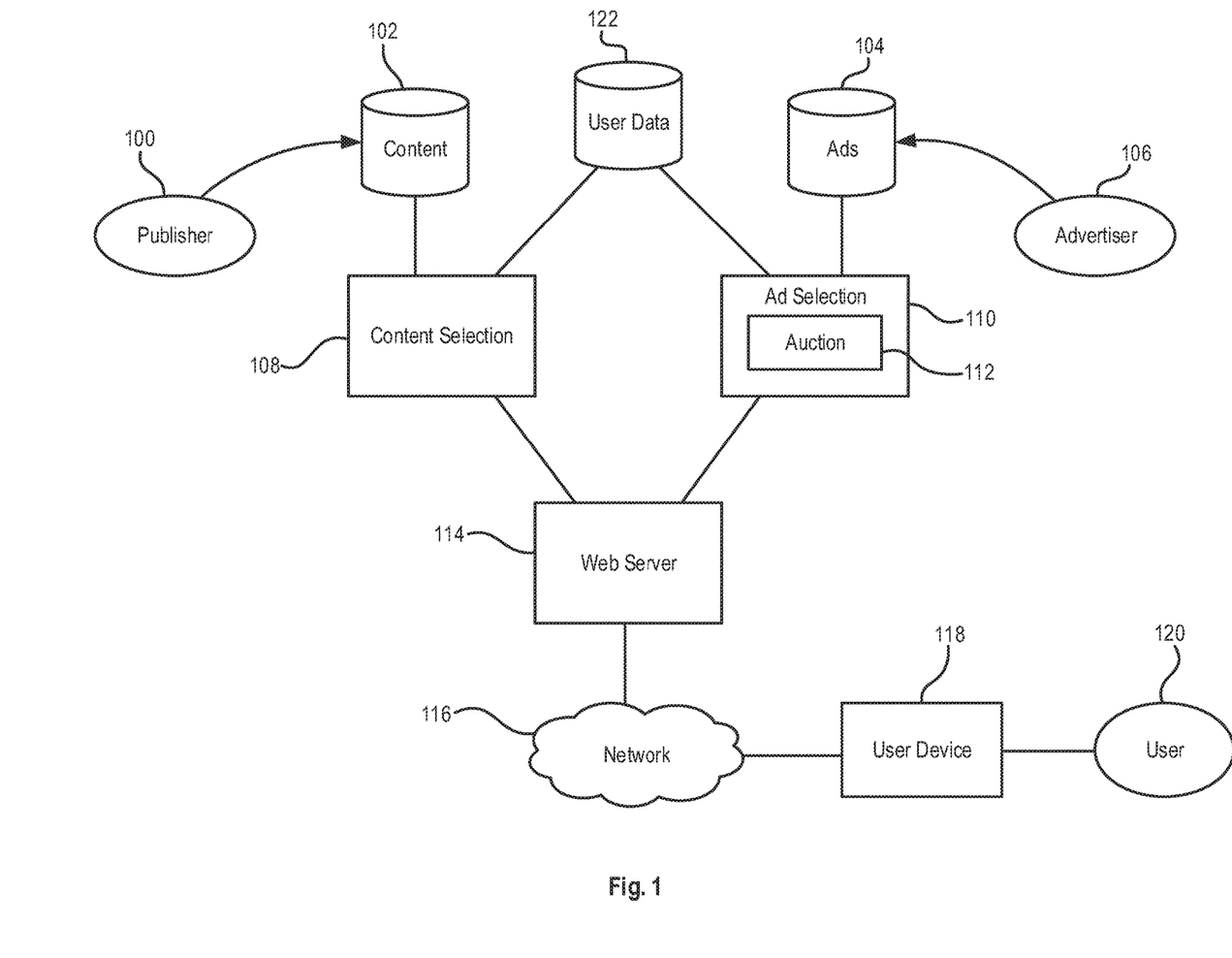
FIG. 1 illustrates a system for displaying ads to a user, in accordance with an embodiment of the present disclosure.

FIG. 1 illustrates a system for displaying ads to a user, in accordance with an embodiment of the present disclosure. One or more publishers 100 provide content that is stored in a content storage 102. One ore more advertisers 106 provide advertisements (ads) that are stored in an ad storage 104. Broadly speaking, when a user 120 requests content for display on a user device 118, the content can be retrieved and displayed on the user device 118 with selected advertisements. In one embodiment, the user request for content may be defined by the user navigating to a web page or web site via an application running on the user device 118, such as a web browser application. The browser generates a request for the web page that is transmitted over a network 116 to a web server 114. The web server 114 is configured to retrieve content and advertising that define the web page for delivery to the user device 118 in response to the request.

In one embodiment, a content selection module 108 is configured to select content from the content storage 102 for retrieval and delivery to the user device 118. It will be appreciated that the selection of content can be based on a variety of factors, including but not limited to the following: recency, time of day, geo-location of the user, popularity, related social network activity, etc. Additionally, content may be selected based on a profile of the user, which may be defined in a user data storage 122, and may include various information about the user, such as the following: age, gender, residence/location, nationality, income, content preferences (explicit or determined based on prior activity), content consumption history, browsing history, etc.

An ad selection module 110 is configured to select advertisements for display to the user. The advertisements may be selected based on characteristics of the content and/or the user (e.g. defined by a content profile or a user profile). As discussed in further detail below with respect to both guaranteed delivery (GD) and non-guaranteed delivery (NGD) markets, a given advertisement may have a specified target, defined by one or more target parameters, such as characteristics of content or characteristics of a target user. Thus, when content is selected for presentation to a particular user, an advertisement whose target parameters match that of the content and/or the user (e.g. match characteristics or profiles of the content and/or user) may be selected for presentation with the selected content to the user. In the case of an NGD advertisement scheme, an auction module 112 is configured to perform an auction to determine which NGD advertisement to select for presentation. After selection of content and advertisements, the web server 114 transmits the selected content and advertising to the user device 118 for rendering on the user device 118.

Though specific embodiments are described herein with reference to web pages displayed in a web browser, it will be appreciated that the concepts and principles discussed herein may readily be applied to any type of system supporting display advertising, including various kinds of applications or apps defined for various kinds of hardware platforms (e.g. mobile devices, televisions, etc.).

In the current guaranteed delivery (GD) advertising market, advertisers purchase contracts that typically specify a target user group (e.g., females in California who visit fashion pages), a future duration for the contract (e.g., January 2013 to March 2013), and the number of user visits (or the number of page impressions) they are interested in obtaining (e.g., 100 million). Web publishers typically guarantee these contracts months in advance of the delivery date. GD contracts can be complex, and the terms of guaranteed contracts are most commonly decided through manual negotiations between a publisher (e.g. a sales representative representing the publisher) and an advertiser (e.g. a media-buyer representing the advertiser). The publisher may attempt to offer a combination of available products that best fits the advertiser's needs while also extracting the maximum possible revenue from the advertiser for the user visits sold (e.g., by marking up the price or offering discounts to close a sale, as appropriate).

In a typical CPM (cost per impression, or cost per thousand impressions) based GD contract, it is important to accurately estimate the true market value of user visits, so that contract negotiations can be effective and fair for both publishers and advertisers. However, negotiations of conventional CPM-based GD contracts are often predicated on the following assumptions: (1) advertisers assume that each visiting user interacts effectively with the visited page long enough to view the displayed ads; (2) publishers assume that each impression (or visit) leads to the same exposure of the ads and thus each impression is sold equally with the same price.

However, important user engagement information, including page-level dwell time that can be used to differentiate user engagement for each visit/impression, and whether a given user's focus is on each shown impression, are missing for purposes of determining pricing fairly and effectively for both publishers/advertisers. Without such information, estimating the true market value of each individual user visit becomes quite challenging. Hence, accurately measuring both the market value of each user visit (impression) for publishers, and the advertising effectiveness for advertisers is difficult based on the conventional CPM-based pricing model. For these reasons, advertisers generally prefer CPC (cost per click) or CPA (cost per action) pricing models, while publishers have practically no other reasonably fair models to choose from besides a CPM pricing model. (It is of course noted that publishers may or may not prefer a CPM-based model because it does not measure the true market value of each individual impression (which may produce different levels of user engagement).)

Accordingly, embodiments of the present disclosure provide for a page-level dwell-time based pricing model for GD contracts. In the dwell-time based pricing model, similar to the conventional CPM-based pricing model, advertisers can purchase contracts that specify a target user audience and a future duration for the contract. However, unlike the conventional CPM-based pricing model, advertisers pay for the total user time spent on page impressions they are interested in obtaining (e.g., 20 thousand hours), and Web publishers guarantee these contracts in advance of the delivery date. The dwell-time based pricing model directly leverages page-level user engagement information for pricing a display advertising contract, and guarantees that each user is exposed to the ad(s) for a specified time that advertisers are interested in procuring (which is not the case in the CPM-based pricing model because of the complex environment of browsers/tabs). Therefore, a dwell-time based pricing model can more accurately reflect the true expected market value of each publisher impression, and thereby facilitate fair and effective contract pricing for both publishers and advertisers.

In accordance with some embodiments, it is possible to achieve better pricing of a GD contract by modifying a CPM-based pricing model in the following approaches: (1) each impression (or each user visit) can be weighted by the dwell-time of each user visit; or (2) the CPM can be replaced in the pricing model with a cost per given time unit (e.g. seconds or minutes or hours).

Figure 2A:
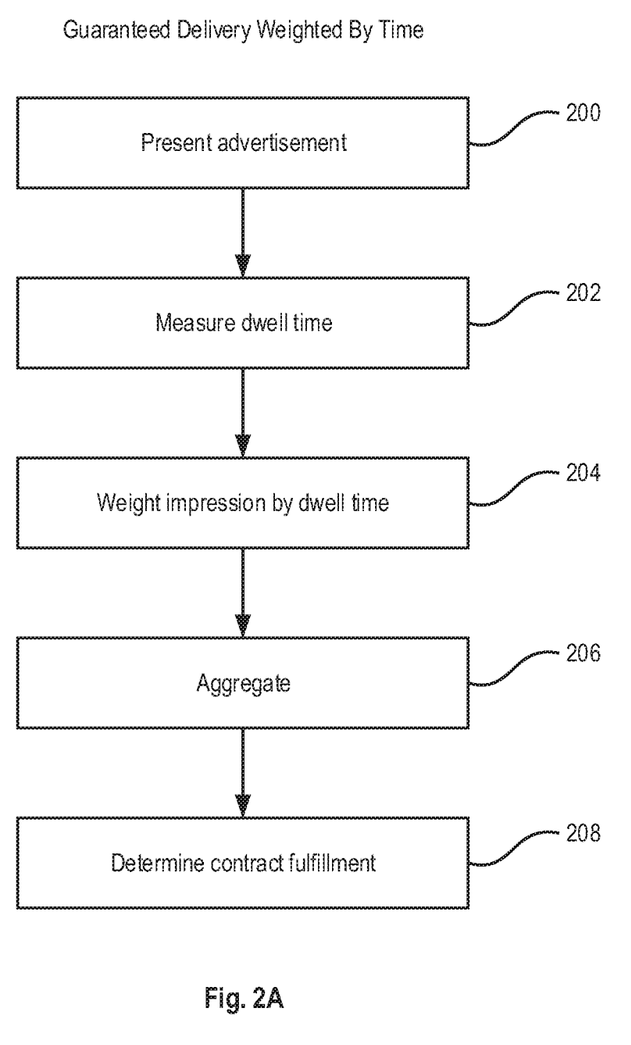
FIG. 2A illustrates a method for performing guaranteed delivery of display advertising weighted by time, in accordance with an embodiment of the present disclosure.

FIG. 2A illustrates a method for performing guaranteed delivery of display advertising weighted by time, in accordance with an embodiment of the present disclosure. At operation 200, a display ad is selected and presented to a user. The display ad has a guaranteed delivery amount associated with it. In one embodiment, the guaranteed delivery amount is defined by a number of impressions. It will be appreciated that the display ad may be selected from a plurality of ads for presentation at a given opportunity based on various factors. For example, in the context of a web page, the display ad may be selected for display based on predefined target parameters matching characteristics of the content shown on the web page and/or a profile of the user viewing the web page. At operation 202, the dwell time of the presentation of the ad is measured. That is, the amount of time that the user viewed or was exposed to the ad during that particular presentation of the ad (e.g. on a web page) is measured and recorded. At operation 204, a record of that particular presentation of the ad is recorded as an impression weighted by the measured dwell time of the presentation. At operation 206, an aggregate (e.g. a sum) of weighted impressions for the advertisement is determined. The aggregate of weighted impressions includes that described above along with other weighted impressions previously recorded for the advertisement. At method operation 208, the aggregate of weighted impressions is compared against the guaranteed delivery amount defined for the advertisement to determine a level of performance of the guaranteed delivery amount for the advertisement.

Figure 2B:
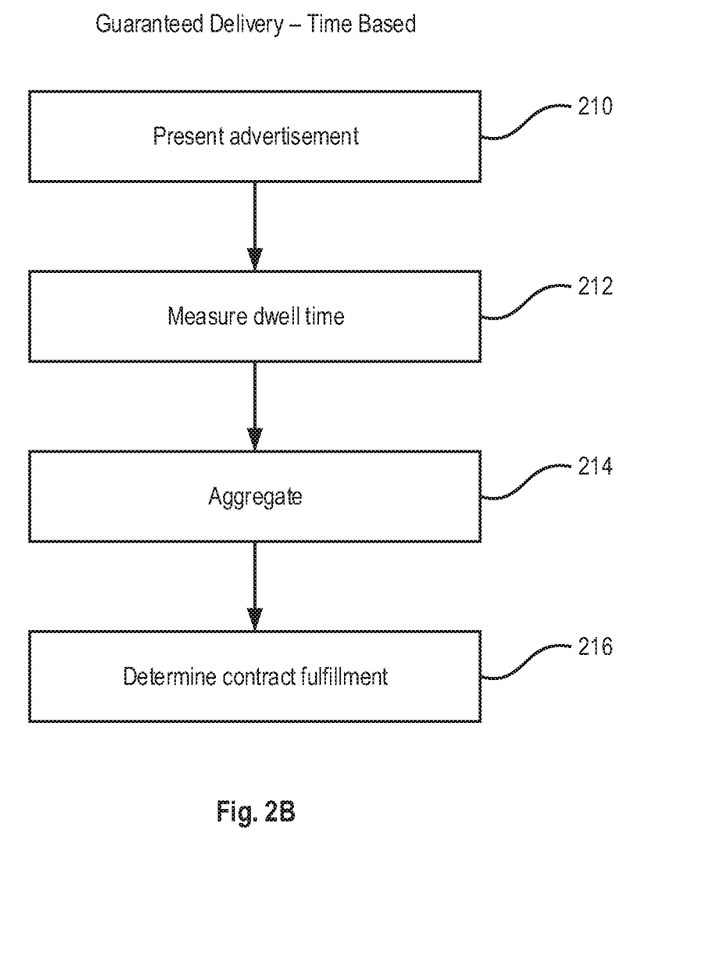
FIG. 2B illustrates a method for performing dwell time-based guaranteed delivery of display advertising, in accordance with an embodiment of the present disclosure.

FIG. 2B illustrates a method for performing dwell time-based guaranteed delivery of display advertising, in accordance with an embodiment of the present disclosure. At operation 210, a display ad is selected and presented to a user. By way of example, the display ad may be presented in conjunction with content via a display context such as a web page or mobile application. The display ad has a guaranteed presentation amount that defines a total amount of (dwell) time that the display ad is to be exposed to users. It is noted that the total amount of time is defined by time that the display ad is actually presented to users (as opposed to a broader time period during which the display ad may be shown, which may also be predefined for the display ad). At method operation 212, the dwell time of the presentation of display ad is measured. At operation 214, the dwell times for the display ad are aggregated, including the measured dwell time of the instant presentation as well as measured dwell times of prior presentations of the display ad. At method operation 216, a level of contract fulfillment is determined by comparing the aggregate dwell time for the advertisement against the guaranteed presentation amount.

Figure 2C:
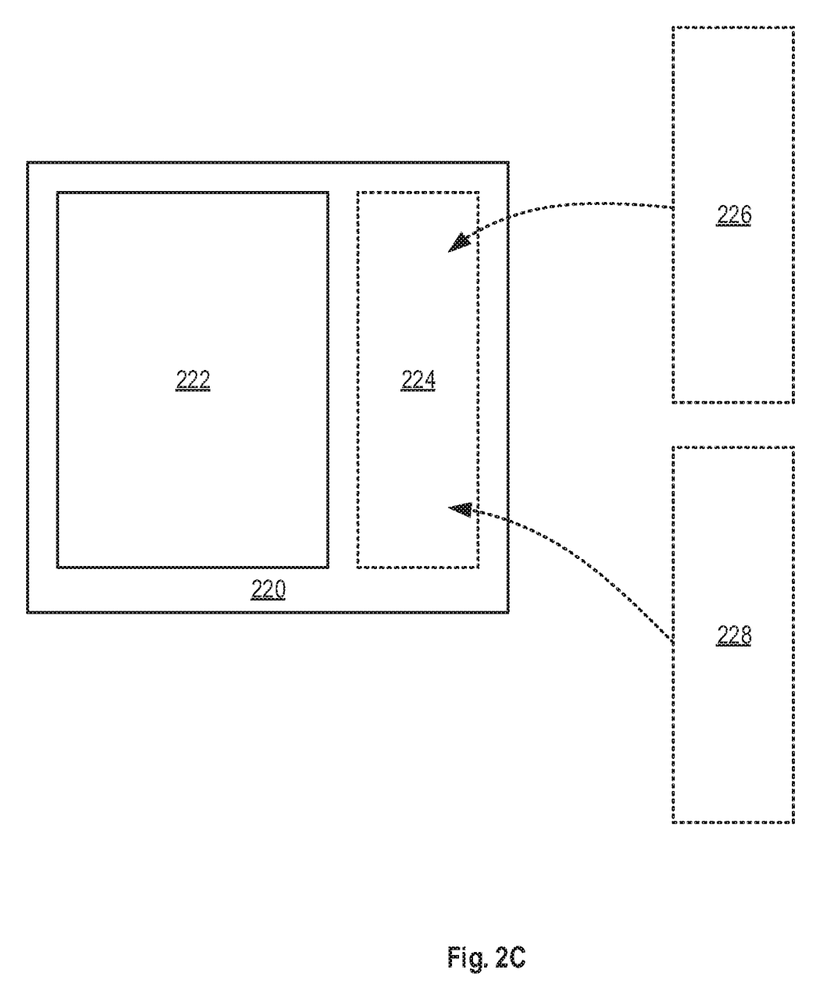
FIG. 2C illustrates a web page having swappable advertisements, in accordance with an embodiment of the present disclosure.

It will be appreciated that the use of dwell time as a measurement of user engagement can also facilitate new advertising methods. For example, it is possible to show multiple advertisements during the same impression and measure the dwell time of each advertisement. With reference to FIG. 2C, a web page is shown having swappable advertisements, in accordance with an embodiment of the present disclosure. The web page 220 in the illustrated embodiment includes a content location 222 and an advertisement location 224. Any of various kinds of content may be presented in the content location 222; and an advertisement can be selected for presentation at the advertisement location 224. Furthermore, during a single impression of the web page 220, multiple advertisements may be shown in the advertisement location 224. For example, during a first time period, an advertisement 226 may be presented in the advertisement location 224, and during a second time period a different advertisement 228 may be presented in the advertisement location 224. Thus, an advertisement may be swapped out for a new advertisement during the same impression of the web page. Though in the illustrated embodiment, two advertisements are shown, it will be appreciated that any number of advertisements may be swapped for each other and displayed during a single impression of the web page 220.

In some embodiments, the advertisements which are swapped for each other may be from the same advertiser. This can be desirable as it allows an advertiser to show multiple advertisements during the same impression. The advertiser may thus present different options to a user and thereby improve the chances that a user will engage with one of the advertisements in some manner The act of changing advertisements for a given advertisement location may also draw the attention of the user to the new advertisement, thereby improving user engagement. Furthermore, for a single impression, the advertiser is able to present different types of advertisements and may therefore better understand a given user based on their reactions to the advertisements with fewer impressions.

In other embodiments, the advertisements which are swapped for each other may be from different advertisers. In this manner, the publisher is able to accommodate more advertisements from different advertisers for a given impression. The publisher may increase revenue per impression as multiple advertisements are shown for a given impression. Also, the publisher is able to accommodate a higher number of GD contracts for a given time period, as a single impression may count towards multiple advertisements (regardless of whether advertisements shown during an impression are from the same or different advertisers).

It will be appreciated that a first advertisement may be displayed for a predefined time period before it is swapped out for a second advertisement presented at the same location. A timer can be configured to determine when the predefined time period has elapsed. The predefined time period thus defines a maximum dwell time per impression for a given advertisement. It will be appreciated that different advertisements may have different predefined time periods (or maximum dwell times per impression) associated therewith.

By way of example, Bharadwaj et al., (Bharadwaj et al., Pricing Guaranteed Contracts in Online Display Advertising, CIKM 2010, which is incorporated by reference herein) have explored how to better estimate the true expected market value of each impression for pricing a GD contract. Their approach uses historical sales prices that are negotiated between a sales person and an advertiser, and the individual user visits that have been obtained under each contract to compute the expected market value/price of the individual user visits for the new GD contract. One of their algorithms (called WAP) computes the value of each user visit in the new contract as the weighted average of the prices (per user visit) of eligible historical contracts.

However, in a pricing model applying dwell-time data, it is possible to compute the expected market value/price of each time unit (e.g. seconds, minutes, or hours) of exposure of publisher pages/websites as the weighted average of the prices (per time unit) of eligible historical contracts. Accordingly, research results on CPM-based GD advertising models can be leveraged for determining the dwell-time based pricing model. By leveraging both dwell-time based user engagement information and existing research, it is possible to more accurately estimate the price of online advertising contracts (products) for both GD and NGD (non-guaranteed delivery) markets.

In contrast to the GD market, Non-Guaranteed Delivery (NGD) advertising defines a spot market where advertisers can buy ad impressions one at a time. Under an NGD mechanism, every time a user loads a web page with an ad slot, an impression opportunity to display an ad is defined. An auction is run among the ads that match the targeting specifications of that particular opportunity and an ad is chosen for display in the ad slot. One example of an NGD system is the Right Media Exchange (RMX) system for NGD contracts. At present, the RMX system handles more than 10 billion NGD transactions per day, with each transaction involving an auction for one impression opportunity and its matching advertising campaigns.

In contrast to the conventional CPM-based GD market, the NGD markets offer advertisers a wider range of payment models. Advertisers can choose to pay per impression (commonly known as a cost-per-impression (CPM) model). They can also choose to pay per click (commonly known as a cost-per-click (CPC) model), or pay per conversion/action (commonly known as a cost-per-conversion/action (CPA) model). These later payment methods may be desirable for the advertiser because an ad impression may not ultimately lead to a desired action on the part of the user, such as a visit to the advertiser's website or a product purchase. In the CPC model, the advertiser will not be charged unless the user clicks on their ad. The CPA model further reduces the risk for the advertiser by allowing the advertiser to pay only when the user takes an action that is of interest to them. Advertisers have control over the definition of these conversion actions. Exemplary actions include but are not limited to the following: subscribing to an email list, registering an account, adding an item to a shopping cart, or making a purchase.

Figure 3:
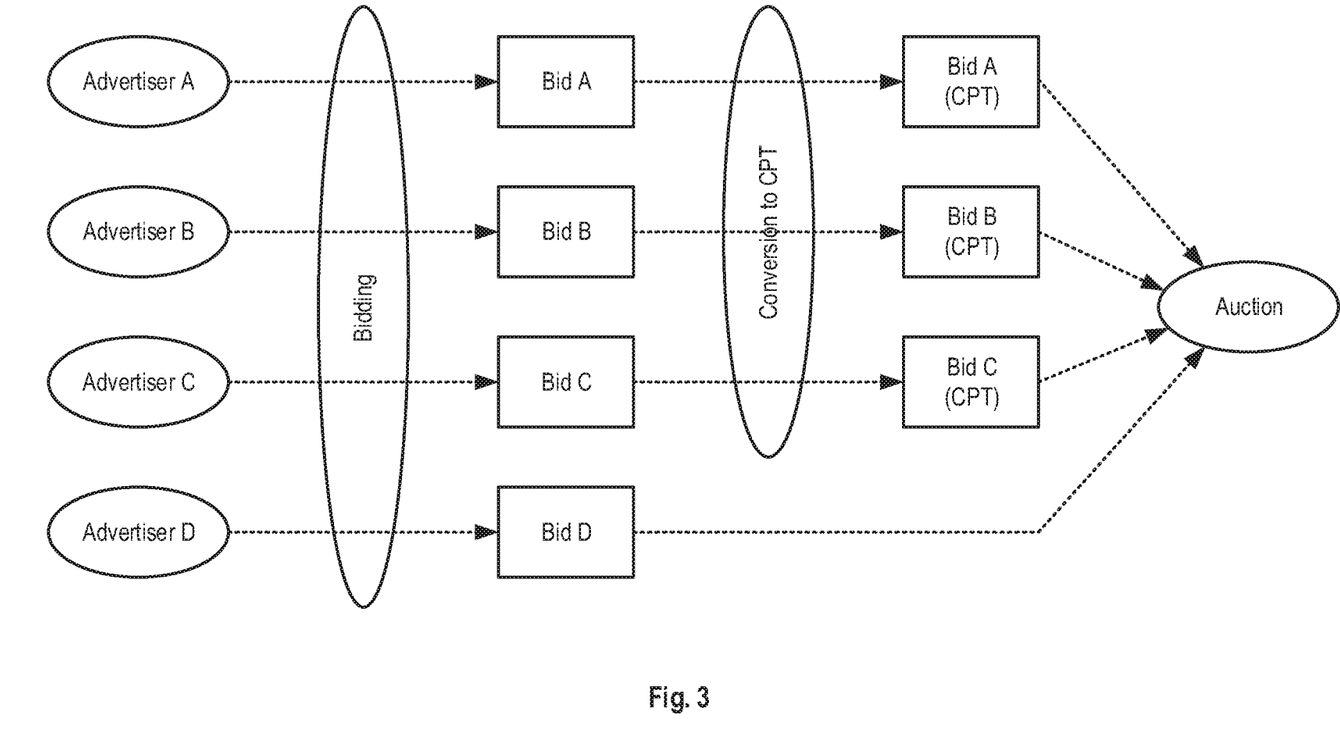
FIG. 3 illustrates a process for performing an NGD advertising auction, in accordance with an embodiment of the present disclosure.

FIG. 3 illustrates a process for performing an NGD advertising auction, in accordance with an embodiment of the present disclosure. As shown, Advertisers A, B, C, and D submit respective bids A, B, C, and D for their respective advertisements. In the illustrated embodiments, the Advertiser A submits a CPM bid; Advertiser B submits a CPC bid; and Advertiser C submits a CPA bid.

In the NGD market, where advertisers with different payment types will compete for the same ad slot, an auction mechanism can be configured to convert bids that are in different payment models to a common base. Expected cost per impression (eCPM) is a widely utilized choice for such a common base. For CPM ads, the expected price per impression (eCPM) would be the same as the bid for that impression. For ads that are defined as pay per click (CPC) or pay per conversion (CPA), the eCPM will depend on the expected click or conversion rate for a given impression. More precisely, for a CPC ad, the eCPM can be expressed as the following: eCPM(CPC)=p(click|impression,ad)*bid; where p(click|impression,ad) is the probability that an impression will result in an ad click. For a CPA ad, the eCPM can be expressed as follows: eCPM(CPA)=p(conversion|impression,ad)*bid; where p(conversion|impression, ad) is the probability that an impression will lead the user to take the action(s) that constitutes a conversion for that advertiser. For more information, reference may be made to Rosales, et al., Post-Click Conversion Modeling and Analysis for Non-Guaranteed Delivery Display Advertising, WSDM 2012, and to R. McAfee, The Design of Advertising Exchanges, Rev Ind Organ, 2011, 39:169-185, which are herein incorporated by reference.

Thus, with continued reference to FIG. 3, the eCPM for Advertiser A's ad is equal to bid A, as bid A is a CPM bid. Whereas, the eCPM for Advertiser B's ad is the probability that an impression will result in an ad click multiplied by the bid B, which is a CPC bid. And the eCPM for Advertiser C's ad is the probability that an impression will result in the conversion action set for the ad multiplied by the bid C, which is a CPA bid.

However, it is noted that user engagement information for a given impression is not accounted for by conventional NGD payment models. Advertisers who choose a CPM pricing scheme in an NGD market are often more interested in building brand awareness where "getting the message out" is the goal. Information about page-level user timespent can accurately measure the exposure of the ads to the targeted audience. However, the conventional CPM-based approach does not account for this important information. Therefore, a Cost Per Time Unit (CPTU) (e.g. minutes/hours/days) payment method for the NGD market is herein presented. That is, an NGD contract can be based on how much time users spend on each publisher's web pages (time spent on impressions) where the ads are shown. In the illustrated embodiment, an additional Advertiser D is shown having submitted a CPTU bid for its advertisement.

Accordingly, a family of expected CPTU (eCPTU) values can be computed for CPC and CPA models so that auctions for an NGD spot market can still run based on existing pricing models. More precisely, eCPTU(CPC)=p(click|timespent on an impression,ad)*bid and eCPTU(CPA)=p(conversion|timespent on an impression,ad)*bid, where p(click|timespent on an impression,ad) is the probability that an impression will result in an ad click after the user is exposed to the impression for a given unit of time, and p(conversion|timespent on an impression,ad) is the probability that an impression will lead the user to take the actions that constitute a conversion for that advertiser after the user is exposed to the impression for a given unit of time. It is also possible to compute eCPTU for a CPM based campaign, that is eCPTU(CPM)=bid/(average timespent per impression*1000), wherein the bid is per thousand impressions. Using CPTU and eCPTU together, an auction can be run based on fine-granular user engagement time unit information as opposed to the impression-based approach.

Thus, with continued reference to FIG. 3, the eCPTU for Advertiser A's ad is bid A divided by one thousand (assuming bid A is a CPM bid per thousand impressions), further divided by the average dwell time per impression. The eCPTU for Advertiser B's ad is the probability that an impression will result in an ad click after the user is exposed to the impression for a given unit of time, multiplied by bid B (a CPC bid). The eCPTU for Advertiser C's ad is the probability that an impression will lead the user to take the actions that constitute a conversion for that advertiser after the user is exposed to the impression for a given unit of time, multiplied by bid C (a CPA bid). Of course, the eCPTU for Advertiser D's ad is the bid D, which is a CPTU bid.

Thus, each of the bids from the Advertisers A, B, and C are converted to a common base—that is, eCPTU. The converted bids, along with Advertiser D's bid, which is already a CPTU bid, are therefore utilized to run an auction for a given ad slot. Because, the bids have all been converted to a common base, they can be compared with relative ease. Furthermore, the eCPTU provides a more accurate and intuitive measurement of the value of an ad, as it defines expected cost (or rather, expected revenue from the perspective of the publisher) as a function of actual presentation time of the ad to users.

Thus the true market value of user interactions is better realized. Publishers that have attracted more user time spent will receive a more accurate fair market-share even when they have the same number or a lesser number of page views than other publisher websites. Advertisers also are guaranteed the exposure time of their ads to the users by the nature of these new payment methods, which are based on user-engagement time spent. Advertisers can also be provided with a better sense of budget and spend per time-period so that they can manage online ad campaign spend more effectively. Publishers can also set a fair time-based (or CPTU based) Reserve Price so that their user engagement's market value can be better reflected.

In various embodiments of the present disclosure, systems can be configured to perform GD and NGD advertising in accordance with the methods described herein. For example, the system described with reference to FIG. 1 can be configured to perform GD and/or NGD advertising in accordance with the principles and methods described herein.

With the new payment methods, it is possible to generate new time-based evaluation methods for evaluating the performance/cost of online ad campaigns. For example, the total ad cost of an ad campaign in the NGD market can measure the realized advertising cost and also directly reflect how long the campaign has been exposed to the users (e.g. by a simple formula: cost/price).

A publisher's total revenue can reflect how successfully it has realized the market value of its owned impressions, and how long users have actually spent on their website(s). This also provides an opportunity for a publisher or content-owner to investigate the possible trade-off between user engagement and revenue. The publisher can also forecast potential users' timespent on each of its owned webpages and price them differently. For example, a higher quality property may command a better market price and therefore driving user engagement on such properties will improve the publisher revenue. This is in contrast to the conventional CPM-based model where a publisher may run the risk of having fewer pageviews if each user spends more time on each page because the page quality has improved.

Under the conventional CPM-based model, a publisher is rewarded for increasing the number of pageviews on its webpage, but not necessarily for improving user engagement. In fact, in the case of a publisher who owns multiple webpages, improving engagement on one or more of the webpages may result in fewer pageviews overall, as users dwell for longer periods of time on a given webpage. Under a CPM-based model, this type of situation leads to unfair results, as a webpage having a relatively low viewership but high user engagement will not be fairly compensated under a CPM-based model. However, by performing online advertising in accordance with the time-based methods and systems as are described herein, user engagement can be accounted for by measuring the user dwell time on a webpage, and dwell time can thus be utilized as a basis for determining advertising cost.

One example of a page that may incur a high level of user engagement is the Yahoo! frontpage (www.yahoo.com), which at present includes a stream view feature wherein users may continuously scroll down to view additional content (e.g. article previews or summaries). Thus, users may spend large amounts of time on just one page view. According to the conventional CPM-based approach, a display ad that is visible during a pageview will only register as a single impression regardless of how much time a user spends during that pageview. However, the CPTU-based approach described herein can account for the amount of time spent by the user during the pageview, and thus provides an improved mechanism for handling online advertising.

Figure 4:
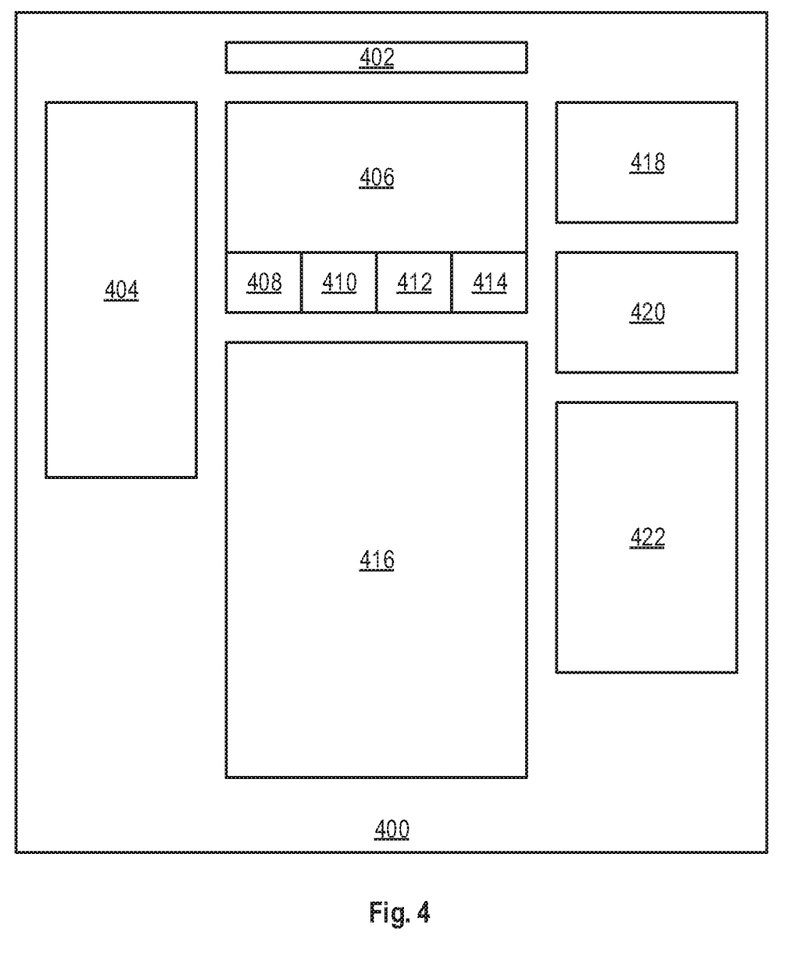
FIG. 4 illustrates a webpage having various modules for content and advertising, in accordance with an embodiment of the present disclosure.

FIG. 4 illustrates a webpage having various modules for content and advertising, in accordance with an embodiment of the present disclosure. In the illustrated embodiment, the webpage 400 includes various modules 402, 404, 406, 408, 410, 412, 414, 416, 418, 420, and 422. Any of these modules may be defined to include content or advertisements, in accordance with various embodiments of the present disclosure. By way of example, in one embodiment, the module 402 defines a search bar in which a user may enter a search query. In another embodiment, the module 402 defines a banner ad placed at the top of the webpage 400. In one embodiment, the module 404 defines a menu of properties or sections to which the user may navigate from the webpage 400. In another embodiment, the module 404 defines a display ad shown on the side of the webpage 400. In one embodiment, the module 406 defines a large preview of an article, with the modules 408, 410, 412, and 414 defining miniature previews of articles. When hovering over one of the miniature previews 408, 410, 412, or 414, its corresponding large preview may be shown in the module 406. In one embodiment, the module 416 defines a series of headlines or article summaries. In another embodiment, the module 416 defines content such as an article or story. In various embodiments, the modules 418, 420, or 422 may define various types of content or advertisements.

For purposes of illustration, certain NGD advertising campaign examples are provided below. These are provided merely by way of example, to provide further clarity regarding implementations in accordance with the present disclosure.

An example of a CPC NGD campaign may specify the following parameters: a target demographic defined by age and location (e.g. age<40; state=California); a duration in which the advertisement(s) for the campaign may run (e.g. Jun. 1, 2010 to Jul. 1, 2010); a bidding total (e.g. 1,000); a maximum CPC (e.g. $2).

An example of a CPA NGD campaign may specify parameters similar to those of the aforementioned CPC NGD campaign, with the exception of the maximum CPC amount. Instead, the CPA NGD campaign may specify a maximum CPA (e.g. $20).

As another example, a CPM campaign can be specified with additional goals, such as CPC or CPA goals. For example, the CPM campaign may specify a target demographic, a duration, a bidding total, and a maximum CPM (e.g. $2). To promote CPC goals, the CPM campaign may also specify a maximum CPC (e.g. $2); whereas to promote CPA goals, the CPM campaign may also specify a maximum CPA (e.g. $20).

A CPTU campaign can be specified with the following parameters: a target demographic, a duration, a bidding total, and a maximum amount per hour of user time spent (e.g. $2). Furthermore, a CPTU campaign may promote CPC or CPA goals by additionally specifying a maximum CPC (e.g. $2) or a maximum CPA (e.g. $20), respectively.

Figure 5:
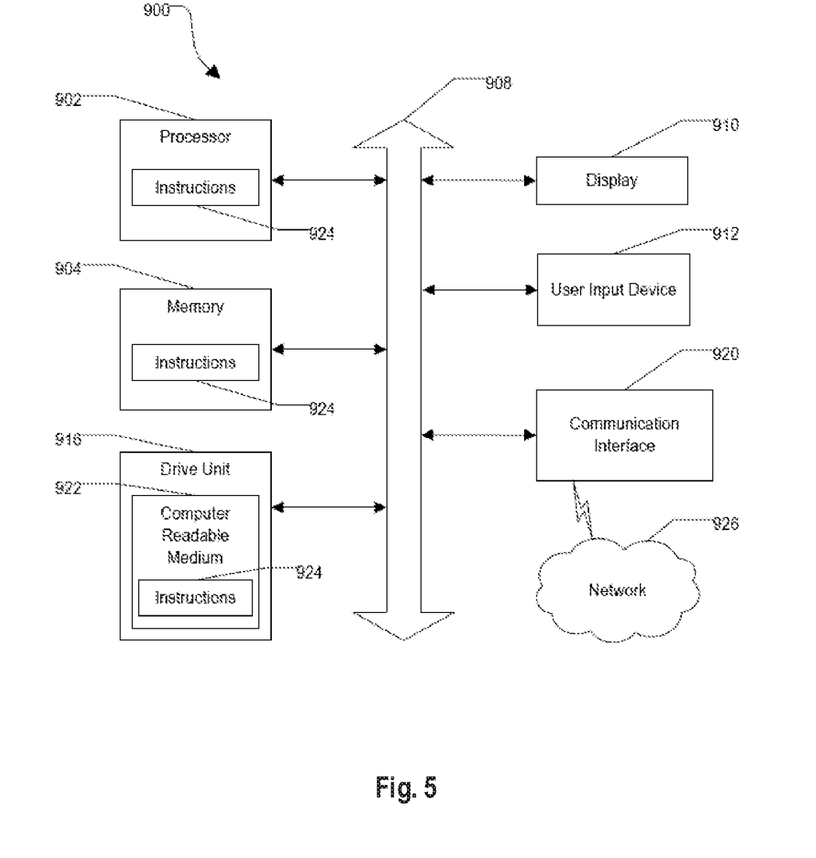
FIG. 5 illustrates an embodiment of a general computer system, in accordance with an embodiment of the present disclosure.

FIG. 5 illustrates an embodiment of a general computer system designated 900. The computer system 900 can include a set of instructions that can be executed to cause the computer system 900 to perform any one or more of the methods or computer based functions disclosed herein. The computer system 900 may operate as a standalone device or may be connected, e.g., using a network, to other computer systems or peripheral devices.

In a networked deployment, the computer system 900 may operate in the capacity of a server or as a client user computer in a server-client user network environment, or as a peer computer system in a peer-to-peer (or distributed) network environment. The computer system 900 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 5, the computer system 900 may include a processor 902, e.g., a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually (i.e., programmed).

The computer system 900 may include a memory 904 that can communicate via a bus 908. The memory 904 may be a main memory, a static memory, or a dynamic memory. The memory 904 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 904 includes a cache or random access memory for the processor 902. In alternative embodiments, the memory 904 is separate from the processor 902, such as a cache memory of a processor, the system memory, or other memory. The memory 904 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 904 is operable to store instructions executable by the processor 902. The functions, acts or tasks illustrated in the figures or described herein may be performed by the programmed processor 902 executing the instructions stored in the memory 904. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 900 may further include a display unit 910, such as a liquid crystal display (LCD), an organic light emitting diode (OLED), a flat panel display, a solid state display, a cathode ray tube (CRT), a projector, a printer or other now known or later developed display device for outputting determined information. The display 910 may act as an interface for the user to see the functioning of the processor 902, or specifically as an interface with the software stored in the memory 904 or in the drive unit 916.

Additionally or alternatively, the computer system 900 may include an input device 912 configured to allow a user to interact with any of the components of system 900. The input device 912 may be a number pad, a keyboard, or a cursor control device, such as a mouse, or a joystick, touch screen display, remote control or any other device operative to interact with the computer system 900.

The computer system 900 may also or alternatively include a disk or optical drive unit 916. The disk drive unit 916 may include a computer-readable medium 922 in which one or more sets of instructions 924, e.g. software, can be embedded. Further, the instructions 924 may embody one or more of the methods or logic as described herein. The instructions 924 may reside completely or partially within the memory 904 and/or within the processor 902 during execution by the computer system 900. The memory 904 and the processor 902 also may include computer-readable media as discussed above.

In some systems, a computer-readable medium 922 includes instructions 924 or receives and executes instructions 924 responsive to a propagated signal so that a device connected to a network 926 can communicate voice, video, audio, images or any other data over the network 926. Further, the instructions 924 may be transmitted or received over the network 926 via a communication port or interface 920, and/or using a bus 908. The communication port or interface 920 may be a part of the processor 902 or may be a separate component. The communication port 920 may be created in software or may be a physical connection in hardware. The communication port 920 may be configured to connect with a network 926, external media, the display 910, or any other components in system 900, or combinations thereof. The connection with the network 926 may be a physical connection, such as a wired Ethernet connection or may be established wirelessly as discussed below. Likewise, the additional connections with other components of the system 900 may be physical connections or may be established wirelessly. The network 926 may alternatively be directly connected to the bus 908.

While the computer-readable medium 922 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed herein. The computer-readable medium 922 may be non-transitory, and may be tangible.

The computer-readable medium 922 can include a solid-state memory such as a memory card or other package that houses one or more non-volatile read-only memories. The computer-readable medium 922 can be a random access memory or other volatile re-writable memory. Additionally or alternatively, the computer-readable medium 922 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 900 may be connected to one or more networks 926. The network 926 may define one or more networks including wired or wireless networks. The wireless network may be a cellular telephone network, an 802.11, 802.16, 802.20, or WiMax network. Further, such networks may include a public network, such as the Internet, a private network, such as an intranet, or combinations thereof, and may utilize a variety of networking protocols now available or later developed including, but not limited to TCP/IP based networking protocols. The network 926 may include wide area networks (WAN), such as the Internet, local area networks (LAN), campus area networks, metropolitan area networks, a direct connection such as through a Universal Serial Bus (USB) port, or any other networks that may allow for data communication. The network 926 may be configured to couple one computing device to another computing device to enable communication of data between the devices. The network 926 may generally be enabled to employ any form of machine-readable media for communicating information from one device to another. The network 926 may include communication methods by which information may travel between computing devices. The network 926 may be divided into sub-networks. The sub-networks may allow access to all of the other components connected thereto or the sub-networks may restrict access between the components. The network 926 may be regarded as a public or private network connection and may include, for example, a virtual private network or an encryption or other security mechanism employed over the public Internet, or the like.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the present disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The above disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various embodiments of the present disclosure have been described, it will be apparent to those of ordinary skill in the art that many more embodiments and implementations are possible within the scope of the present disclosure. Accordingly, the present disclosure is not to be restricted except in light of the attached claims and their equivalents.

The invention claimed is:

1. A method, comprising:
receiving, by a server over a network, a request for a web page from a client device;
in response to the request from the client device:
receiving a first bid, of a cost per impression (CPM) payment model type, for an ad slot from a first advertiser associated with an advertisement;
receiving a second bid, of a cost per click (CPC) payment model type, for the ad slot from a second advertiser associated with a second advertisement;
receiving a third bid, of a cost per conversion (CPA) payment model type, for the ad slot from a third advertiser associated with a third advertisement;
converting the first bid, the second bid and the third bid to a common base, corresponding to expected cost per time unit (eCPTU), to generate a first eCPTU corresponding to the first bid, a second eCPTU corresponding to the second bid and a third eCPTU corresponding to the third bid, wherein the common base used to generate the first eCPTU, the second eCPTU and the third eCPTU enables a processor to perform comparison of the first eCPTU, the second eCPTU and the third eCPTU with increased ease;
running an auction for the ad slot based on the first eCPTU, the second eCPTU and the third eCPTU, such that the auction is run using fine-granular user engagement time unit information not accounted for by at least one of the CPM payment model type, the CPC payment model type or the CPA payment model type;
selecting, by the server, the advertisement for presentation on the web page based on the auction, and
transmitting the web page by the server over the network to the client device for presentation at the client device,
the web page being configured, when presented at the client device, to log event data indicative of user interaction with the web page to generate logged event data;
receiving, by the server over the network from the client device, a client-side beacon comprising the logged event data comprising a page unhide event associated with a second web page;
in response to receiving the client-side beacon comprising the logged event data from the client device, processing the logged event data to determine a duration of exposure of the advertisement when the web page is presented on the client device;
in response to determining the duration of exposure of the advertisement, determining a level of performance of a guaranteed presentation amount associated with the advertisement, the level of performance based on the duration of exposure of the advertisement, wherein the guaranteed presentation amount defines a guaranteed number of impressions for the advertisement;
tracking, by one or more processors of the server, an activation of an external link defined on the web page, the external link providing access to a third web page different than the second web page;
determining, by the one or more processors of the server, a display time of the third web page based on the tracked activation of the external link and the client-side beacon comprising the logged event data, wherein determining the display time of the third web page includes determining a time interval between the activation of the external link and the page unhide event in the logged event data of the client-side beacon;
wherein determining the level of performance includes assigning a weight to the presentation of the advertisement to generate a weighted presentation, the weight being determined from the duration of exposure, and aggregating the weighted presentation of the advertisement with prior weighted presentations of the advertisement to generate aggregated weighted presentations, each prior weighted presentation being defined by a prior presentation of the advertisement weighted by a prior duration of exposure, the aggregated weighted presentations being compared against the guaranteed number of impressions to determine the level of performance of the guaranteed presentation amount; and
controlling online display advertising based on the level of performance and the display time of the third web page accessed via the external link defined on the web page.

2. The method of claim 1, wherein using the duration of exposure of the advertisement to determine the level of performance is associated with an increased effectiveness of management of an online advertising campaign for an advertiser of the advertisement.

3. The method of claim 1, comprising leveraging the level of performance to estimate a parameter of an online advertising contract, wherein using the level of performance to estimate the parameter is associated with an increase in accuracy.

4. The method of claim 1, comprising transmitting a fourth web page by the server over the network to a second client device for presentation at the second client device, the fourth web page comprising the advertisement which is displayed at an advertisement location of the fourth web page at a first time period, wherein the advertisement is swapped for a fourth advertisement which is displayed at the advertisement location at a second time period, wherein the swapping is associated with an improved understanding of a user of the second client device.

5. The method of claim 1, comprising transmitting a fourth web page by the server over the network to a second client device for presentation at the second client device, the fourth web page comprising the advertisement which is displayed at an advertisement location of the fourth web page at a first time period, wherein the advertisement is swapped for a fourth advertisement which is displayed at the advertisement location at a second time period, wherein the swapping is associated with improved user engagement.

6. The method of claim 1, wherein using the duration of exposure of the advertisement to determine the level of performance is associated with an increased accuracy of the level of performance.

7. The method of claim 1, comprising determining contract pricing based on the level of performance.

8. The method of claim 1, wherein at least some of the method is performed using at least one of distributed processing or parallel processing.

9. A non-transitory computer-readable medium comprising instructions that when executed by a processor, perform operations comprising:
   receiving, by a server over a network, a request for a web page from a client device;
   in response to the request from the client device:
      receiving a first bid, of a cost per impression (CPM) payment model type, for an ad slot from a first advertiser associated with an advertisement;
      receiving a second bid, of a cost per click (CPC) payment model type, for the ad slot from a second advertiser associated with a second advertisement;
      receiving a third bid, of a cost per conversion (CPA) payment model type, for the ad slot from a third advertiser associated with a third advertisement;
      converting the first bid, the second bid and the third bid to a common base, corresponding to expected cost per time unit (eCPTU), to generate a first eCPTU corresponding to the first bid, a second eCPTU corresponding to the second bid and a third eCPTU corresponding to the third bid, wherein the common base used to generate the first eCPTU, the second eCPTU and the third eCPTU enables a processor to perform comparison of the first eCPTU, the second eCPTU and the third eCPTU with increased ease;
      running an auction for the ad slot based on the first eCPTU, the second eCPTU and the third eCPTU, such that the auction is run using fine-granular user engagement time unit information not accounted for by at least one of the CPM payment model type, the CPC payment model type or the CPA payment model type;
      selecting, by the server, the advertisement for presentation on the web page based on the auction, and
      transmitting the web page by the server over the network to the client device for presentation at the client device,
      the web page being configured, when presented at the client device, to log event data indicative of user interaction with the web page to generate logged event data;
   receiving, by the server over the network from the client device, a client-side beacon comprising the logged event data comprising a page unhide event associated with a second web page;
   in response to receiving the client-side beacon comprising the logged event data from the client device, processing the logged event data to determine a duration of exposure of the advertisement when the web page is presented on the client device;
   in response to determining the duration of exposure of the advertisement, determining a level of performance of a guaranteed presentation amount associated with the advertisement, the level of performance based on the duration of exposure of the advertisement, wherein the guaranteed presentation amount defines a guaranteed number of impressions for the advertisement;
   tracking, by one or more processors of the server, an activation of an external link defined on the web page, the external link providing access to a third web page different than the second web page;
   determining, by the one or more processors of the server, a display time of the third web page based on the tracked activation of the external link and the client-side beacon comprising the logged event data, wherein determining the display time of the third web page includes determining a time interval between the activation of the external link and the page unhide event in the logged event data of the client-side beacon;
   wherein determining the level of performance includes assigning a weight to the presentation of the advertisement to generate a weighted presentation, the weight being determined from the duration of exposure, and aggregating the weighted presentation of the advertisement with prior weighted presentations of the advertisement to generate aggregated weighted presentations, each prior weighted presentation being defined by a prior presentation of the advertisement weighted by a prior duration of exposure, the aggregated weighted presentations being compared against the guaranteed number of impressions to determine the level of performance of the guaranteed presentation amount; and
   controlling online display advertising based on the level of performance and the display time of the third web page accessed via the external link defined on the web page.

10. The non-transitory computer-readable medium of claim 9, the operations comprising leveraging the level of performance to estimate a parameter of an online advertising contract.

11. The non-transitory computer-readable medium of claim 9, the operations comprising transmitting a fourth web page by the server over the network to a second client device for presentation at the second client device, the fourth web page comprising the advertisement which is displayed at an advertisement location of the fourth web page at a first time period, wherein the advertisement is swapped for a fourth advertisement which is displayed at the advertisement location at a second time period.

12. The non-transitory computer-readable medium of claim 9, the operations comprising transmitting a fourth web page by the server over the network to a second client device for presentation at the second client device, the fourth web page comprising the advertisement which is displayed at an advertisement location of the fourth web page at a first time period, wherein the advertisement is swapped for a fourth advertisement which is displayed at the advertisement location at a second time period.

13. The non-transitory computer-readable medium of claim 9, the operations comprising determining contract pricing based on the level of performance.

14. The non-transitory computer-readable medium of claim 9, wherein at least some of the operations are performed using at least one of distributed processing or parallel processing.

15. A computer system, comprising:
one or more processors; and
memory comprising instructions that when executed by at least one of the one or more processors, perform operations comprising:
receiving, by a server over a network, a request for a web page from a client device;
in response to the request from the client device:
receiving a first bid, of a cost per impression (CPM) payment model type, for an ad slot from a first advertiser associated with an advertisement;
receiving a second bid, of a cost per click (CPC) payment model type, for the ad slot from a second advertiser associated with a second advertisement;
receiving a third bid, of a cost per conversion (CPA) payment model type, for the ad slot from a third advertiser associated with a third advertisement;
converting the first bid, the second bid and the third bid to a common base, corresponding to expected cost per time unit (eCPTU), to generate a first eCPTU corresponding to the first bid, a second eCPTU corresponding to the second bid and a third eCPTU corresponding to the third bid, wherein the common base used to generate the first eCPTU, the second eCPTU and the third eCPTU enables a processor to perform comparison of the first eCPTU, the second eCPTU and the third eCPTU with increased ease;
running an auction for the ad slot based on the first eCPTU, the second eCPTU and the third eCPTU, such that the auction is run using fine-granular user engagement time unit information not accounted for by at least one of the CPM payment model type, the CPC payment model type or the CPA payment model type;
selecting, by the server, the advertisement for presentation on the web page based on the auction, and
transmitting the web page by the server over the network to the client device for presentation at the client device,
the web page being configured, when presented at the client device, to log event data indicative of user interaction with the web page to generate logged event data;
receiving, by the server over the network from the client device, a client-side beacon comprising the logged event data comprising a page unhide event associated with a second web page;
in response to receiving the client-side beacon comprising the logged event data from the client device, processing the logged event data to determine a duration of exposure of the advertisement when the web page is presented on the client device;
in response to determining the duration of exposure of the advertisement, determining a level of performance of a guaranteed presentation amount associated with the advertisement, the level of performance based on the duration of exposure of the advertisement, wherein the guaranteed presentation amount defines a guaranteed number of impressions for the advertisement;
tracking, by one or more processors of the server, an activation of an external link defined on the web page, the external link providing access to a third web page different than the second web page;
determining, by the one or more processors of the server, a display time of the third web page based on the tracked activation of the external link and the client-side beacon comprising the logged event data, wherein determining the display time of the third web page includes determining a time interval between the activation of the external link and the page unhide event in the logged event data of the client-side beacon;
wherein determining the level of performance includes assigning a weight to the presentation of the advertisement to generate a weighted presentation, the weight being determined from the duration of exposure, and aggregating the weighted presentation of the advertisement with prior weighted presentations of the advertisement to generate aggregated weighted presentations, each prior weighted presentation being defined by a prior presentation of the advertisement weighted by a prior duration of exposure, the aggregated weighted presentations being compared against the guaranteed number of impressions to determine the level of performance of the guaranteed presentation amount; and
controlling online display advertising based on the level of performance and the display time of the third web page accessed via the external link defined on the web page.

16. The computer system of claim 15, the operations comprising leveraging the level of performance to estimate a parameter of an online advertising contract.

17. The computer system of claim 15, the operations comprising transmitting a fourth web page by the server over the network to a second client device for presentation at the second client device, the fourth web page comprising the advertisement which is displayed at an advertisement location of the fourth web page at a first time period, wherein the advertisement is swapped for a fourth advertisement which is displayed at the advertisement location at a second time period.

18. The computer system of claim 15, the operations comprising transmitting a fourth web page by the server over the network to a second client device for presentation at the second client device, the fourth web page comprising the advertisement which is displayed at an advertisement location of the fourth web page at a first time period, wherein the advertisement is swapped for a fourth advertisement which is displayed at the advertisement location at a second time period.

19. The computer system of claim 15, the operations comprising determining contract pricing based on the level of performance.

20. The computer system of claim 15, wherein at least some of the operations are performed using at least one of distributed processing or parallel processing.

\* \* \* \* \*